Patented Sept. 8, 1942

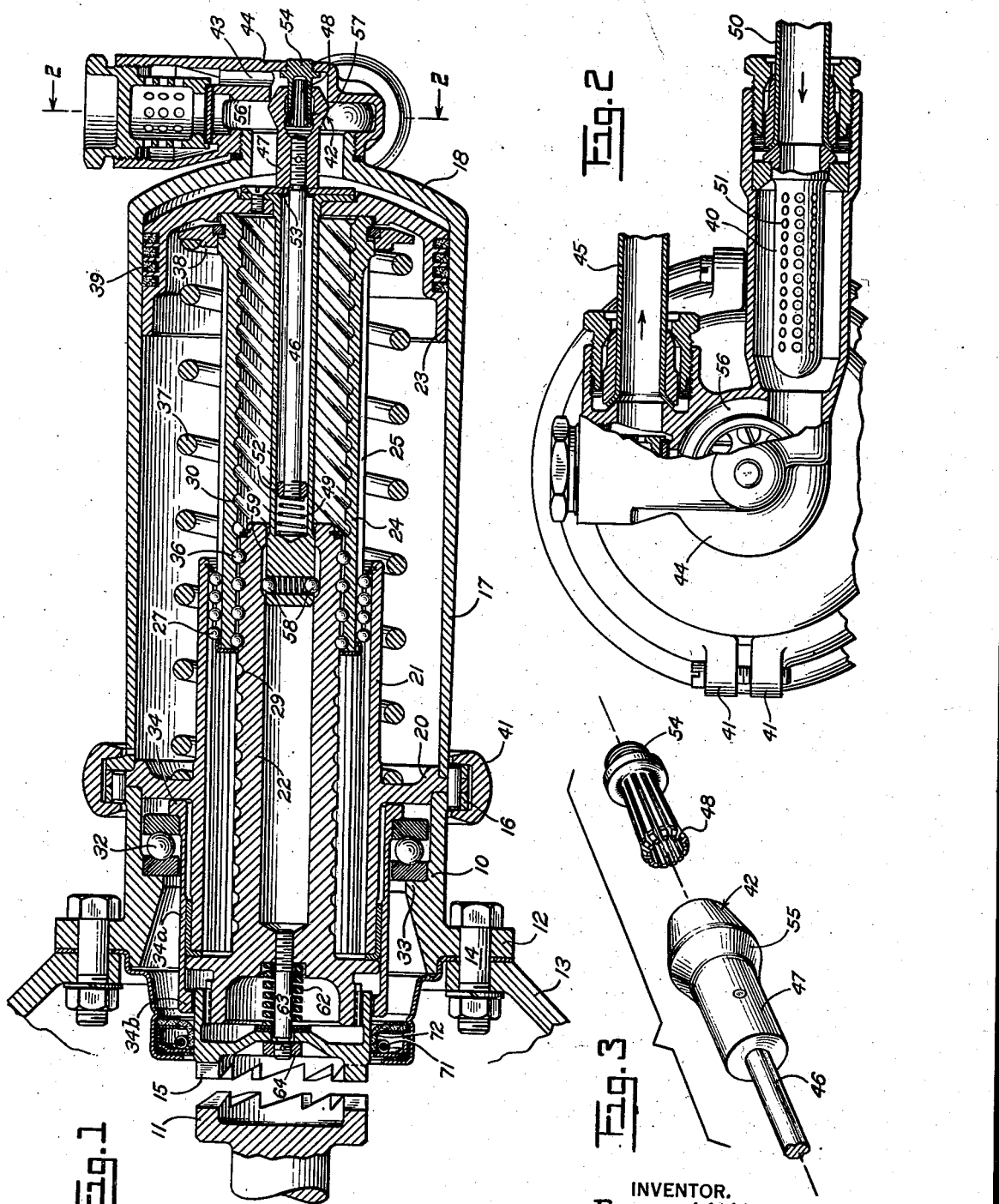

2,295,288

UNITED STATES PATENT OFFICE 2,295,288

ENGINE STARTING MECHANISM

Romeo M. Nardone, East Orange, N. J., assignor, by mesne assignments, to Bendix Aviation Corporation, South Bend, Ind., a corporation of Delaware Application October 2, 1937, Serial No. 167,054

3 Claims. (Cl. 123—179)

This invention relates to engine starters adapted for utilizing fluid pressure, as from air precompressed into a reservoir or from an explosive cartridge, the fluid pressure being operable upon a confined piston in the illustrated embodiment of the invention.

One of the objects of this invention is to obtain a relatively large number of starting turns of an engine crankshaft, from a relatively short piston travel.

Another object is to provide means for obtaining a corresponding number of turns of an engine engaging clutch independently of any rotation of the piston.

Another object of the invention is to provide improvements in the type of engine starter disclosed in my application No. 100,000 filed in the United States Patent Office on September 9, 1936, the nature and scope of which improvements are indicated in the accompanying drawing and the following particular description of one form of mechanism embodying the invention. It is to be understood, however, that the drawing is for the purpose of illustration only, and is not designed as a definition of the limits of the invention, reference being had to the appended claims for this purpose.

In the drawing:

Fig. 1 is a longitudinal sectional view of a device embodying the invention;

Fig. 2 is a transverse sectional view along the line 2—2 of Fig. 1; and

Fig. 3 is a perspective view of the valve assembly.

With reference to the drawing, and more particularly to Fig. 1, the piston actuated unit is contained within a sectional housing including cylindrical parts 17 and 16, the latter having a flange 12 by which it is secured to the engine crankcase 13 as by bolts 14, the flange being conveniently of a size standardized for aircraft engine starters. The engine crankshaft, or other drive shaft (not shown) is provided with a clutch-element 11 engageable by the piston actuated clutch-element 15 as will be later more fully described.

Cylinder 17 has a head end 18 and a crank end 20, the latter being shown as an integral part of a splined tube 21. Slidably fitted within the cylinder 17 is a piston 23 movable with a hollow internally and helically grooved screw 24 which is externally splined as at 25, to cooperate with the internally splined tube 21, a free sliding action being facilitated by provision of balls 27. A second screw 22 is drivably connected with the screw 24 by helical grooves or threads 29 and 30 which permit the axial travel of the piston 23 but cause rotation of the screw 22 because of friction reducing balls 36 inserted in the helical grooves 29 and 30. An anti-friction thrust bearing 32 is preferably interposed between a flanged skirt 34 on rear end of spacer 34a and an inwardly extending circular rim 33 of the cylindrical part 10. The inwardly extending rim 34b on the forward end of spacer 34a takes the thrust as jaw 15 rides into mesh with engine member 11. A spring 37 has one end resting against the closure plate 20 of the cylinder 17, and its opposite end abuts the thrust ring 38 which moves forward with the piston 23. Piston rings 39 insure against the loss of pressure as the piston moves forward, and also yieldably oppose rotation of the piston, even though twisting of spring 37 should occasionally cause ring 38 to rotate to some extent (the said ring 38 having a running fit about screw 24).

Due to the bolted split clamp connection 41 between the cylinder 17 and the body flange 16, the former may be quickly detached for removing any fouling that may occur where combustible cartridges are used as the source of fluid pressure to move the piston 23.

The present invention also preferably includes improved means for automatically controlling the exhaust of the fluid pressure from the cylinder upon completion of each operation. This exhaust control may be effected by providing an exhaust valve 42 adapted to cooperate with an exhaust port 43 conveniently formed in the housing 44, and communicating with an exhaust connection 45 (Fig. 2) leading to any desired point. In the case of an airplane, for example, this exhaust connection will lead to a point exteriorly of the fuselage. The valve 42 is carried by a stem 46 which is of such a length that with the piston in the position indicated in Figure 1, a spring 49 will bear against an enlarged head 52 on the stem 46 to hold valve 42 closed. Into housing 44 there extends a cup-shaped grid 40 which receives that part of the powder charge which is propelled from the breech into the feed tube 50, said solid charge being then consumed by the generated heat, and the resultant gases pass through ports 51 into the chamber 56. This fluid pressure will act upon the head portion of the valve 42 in such manner as to assist the spring 49 in maintaining the said exhaust valve 42 closed; but as the piston nearly reaches the end of its movement, a collar 53 extending inwardly of piston 23 and surrounding the stem 46 will be brought into engagement with the head 52, and will be effective to unseat the exhaust valve 42. The exhaust valve having been unseated in the manner described, the fingered catch 48 (Figs. 1 and 3) will cooperate with the internally formed circular bead 57 of valve 42 for yieldably holding said valve in open position, its maximum opening movement being likewise limited by the restraining action of the fingers of said element 48. The neck-portion 54 of catch 48 is externally threaded, as shown, for adjustably positionable retention in the housing 44.

The piston having completed its operative stroke, and the exhaust valve having been opened, the piston will be urged on its return stroke by the coil spring 37. During this return movement, the exhaust valve being held open, the cylinder will be effectively scavenged. Due to the action of the catch 48 the valve will remain open until such time as the piston collar 53 is brought to bear against the valve stem 47 for again seating the valve. This insures closing movement of the valve at the time the piston has substantially completed its return movement, the closing being initiated and assisted by the action of the spring means 49 above described. There is thus provided automatically controlled exhaust means, which exhaust means is of such construction as to remain open during the major portion of the return stroke of the piston so as to aid attainment of substantially complete scavenging; moreover, the "streamlining" of the valve surface, as indicated at 55 (Fig. 3) tends to accelerate the exhaust flow and thus provides an added assurance of complete scavenging.

By reason of the action of spring-pressed balls 58 upon recess 59 in sleeve 22, the initial axial movement of the piston 23 will be transmitted to said sleeve 22, and the resultant axial thrust will be yieldably imparted to jaw 15 through a compressible spring 62 mounted on a rod 63 having at its outer end a nut 64 permitting adjustment of the action of spring 62. Upon resistance to axial travel (as by collision of the tooth corners) spring 62 will permit the continued advance of sleeve 22 under the urge of the balls 58 thereupon. Meanwhile the action of the threads 29, 30 will produce sufficient rotation of sleeve 22 and hence of clutch member 15, splined thereto, to relieve the condition of corner tooth contact, whereupon spring 62 becomes effective to complete the "meshing" (engaging) action. During this operation toroidal spring 71 exerts a radially directed pressure, through leather sealing gasket 72, upon the clutch member 15, producing a friction which prevents too rapid rotation of the member 15 prior to complete meshing, and hence tends to accelerate complete meshing, as well as to insure a tight sealing of the unit against seepage of oil from the engine crankcase along the surface of the clutch 15, and into the starting apparatus.

What is claimed is:

1. In starting apparatus of the type embodying an engine engaging jaw clutch member, automatic means having engagement with said jaw clutch member for facilitating movement of the latter into engagement with a member of the engine to be started, said automatic means including a flexible ring of organic material, and means for exerting an inwardly directed pressure on said ring to reduce the amount of relative rotation between said ring and jaw clutch member.

2. In starting apparatus of the type embodying an engine engaging clutch member, automatic means having engagement with said clutch member for facilitating movement of the latter into engagement with a member of the engine to be started, said automatic means including a flexible ring of organic material surrounding said clutch member, and further including a driving part splined to said clutch member, and means including radially pressed elements engaging said driving part to advance both said driving part and said clutch member axially to an extent sufficient to produce movement of said clutch member to engine engaging position.

3. In starting apparatus of the type embodying an engine engaging clutch member, automatic means having engagement with said clutch member for facilitating movement of the latter into engagement with a member of the engine to be started, said automatic means including a flexible ring of organic material surrounding said clutch member, and further including a driving part splined to said clutch member, and means including a fluid pressure actuated plunger and radially pressed elements carried by said plunger to engage said driving part and advance both said driving part and said clutch member axially to an extent sufficient to produce movement of said clutch member to engine engaging position.

ROMEO M. NARDONE.